US010730708B2

(12) United States Patent
Otsuru (10) Patent No.: US 10,730,708 B2
(45) Date of Patent: Aug. 4, 2020

(54) UNLOADING APPARATUS AND UNLOADING METHOD

(71) Applicants: KABUSHIKI KAISHA TOSHIBA, Tokyo (JP); Toshiba Infrastructure Systems & Solutions Corporation, Kanagawa (JP)

(72) Inventor: Yoshihide Otsuru, Yokohama Kanagawa (JP)

(73) Assignees: KABUSHIKI KAISHA TOSHIBA, Tokyo (JP); TOSHIBA INFRASTRUCTURE SYSTEMS & COLUTIONS CORP., Kanagawa (JP)

( * ) Notice: Subject to any disclaimer, the term of this patent is extended or adjusted under 35 U.S.C. 154(b) by 100 days.

(21) Appl. No.: 16/110,689

(22) Filed: Aug. 23, 2018

(65) Prior Publication Data

US 2019/0071267 A1 Mar. 7, 2019

(30) Foreign Application Priority Data

Sep. 7, 2017 (JP) ................................. 2017-172262

(51) Int. Cl.
*B65G 61/00* (2006.01)
*B25J 11/00* (2006.01)
(Continued)

(52) U.S. Cl.
CPC ............ *B65G 61/00* (2013.01); *B25J 9/1679* (2013.01); *B25J 11/00* (2013.01); *B25J 15/0616* (2013.01);
(Continued)

(58) Field of Classification Search
CPC combination set(s) only.
See application file for complete search history.

(56) References Cited

U.S. PATENT DOCUMENTS 2,675,928 A 4/1954 Slater
3,257,005 A 6/1966 Annnable et al.
(Continued)

FOREIGN PATENT DOCUMENTS

JP  H06-255790 A  9/1994
JP  H09-323830 A  12/1997
(Continued)

OTHER PUBLICATIONS

Extended European Search Report dated Jan. 30, 2019, mailed in counterpart European Application No. 18191879.8, 9 pages.

*Primary Examiner* — Kyle O Logan
(74) *Attorney, Agent, or Firm* — Kim & Stewart LLP (57) ABSTRACT

An unloading apparatus for unloading cargo items from a cargo group on a cargo bed includes a cargo bed lifting and lowering mechanism, a first detection unit that measures heights of cargos items and detects positions of cargo items forming the upper surface of the cargo group, a moving device that moves the cargo items to an unloading position, a second detection unit that detects whether a lower end of a cargo item being held by the moving device is above a position that is higher than the highest position of the cargo items at the upper surface of the cargo group, and a controller. The controller controls the raising and lowering of cargo bed in conjunction with the lifting of cargo items. The controller also controls the moving of the cargo items to the unloading position.

20 Claims, 3 Drawing Sheets

(51) Int. Cl.
  *B25J 15/06* (2006.01)
  *B65G 59/02* (2006.01)
  *B65G 59/04* (2006.01)
  *B25J 9/16* (2006.01)
  *B65G 47/244* (2006.01)

(52) U.S. Cl.
  CPC ............ *B65G 59/02* (2013.01); *B65G 59/04* (2013.01); *B65G 47/244* (2013.01); *B65G 59/026* (2013.01); *B65G 2203/042* (2013.01); *B65G 2814/031* (2013.01)

(56) References Cited

U.S. PATENT DOCUMENTS

| | | | | |
|---|---|---|---|---|
| 4,988,263 | A * | 1/1991 | Odenthal | B65G 59/026 414/795.8 |
| 5,993,146 | A * | 11/1999 | Hallgren | B65G 1/07 187/269 |
| 2007/0280812 | A1 * | 12/2007 | Morency | B25J 15/0253 414/729 |
| 2015/0203304 | A1 * | 7/2015 | Morency | B65G 59/02 414/797 |
| 2016/0347558 | A1 | 12/2016 | Eto et al. | |
| 2017/0137236 | A1 | 5/2017 | Sonoura et al. | |
| 2018/0057283 | A1 * | 3/2018 | Peters | B25J 5/007 |

FOREIGN PATENT DOCUMENTS

| JP | 2001-213521 A | 8/2001 |
|---|---|---|
| JP | 2012-192478 A | 10/2012 |
| JP | 2013-086914 A | 5/2013 |

\* cited by examiner

UNLOADING APPARATUS AND UNLOADING METHOD

CROSS-REFERENCE TO RELATED APPLICATION

This application is based upon and claims the benefit of priority from Japanese Patent Application No. 2017-172262, filed Sep. 7, 2017, the entire contents of which are incorporated herein by reference.

FIELD

Embodiments described herein relate generally to an unloading apparatus that unloads an item of cargo from a cargo grouping comprising a plurality of cargo items on a cargo bed and an unloading method for items of cargo from a cargo grouping.

BACKGROUND

In a distribution warehouse in which cargo, such as merchandise, is stored and from which the stored cargo is ultimately shipped, an unloading apparatus may be used to unload cargo items onto a conveyer belt or the like. An unloading apparatus that includes a robot arm with a cargo grasping unit, such as a suction unit, provided on a tip end of the robot arm, is known.

Items of cargo are conveyed to the unloading apparatus in a palletized state (stacked on a pallet). The unloading apparatus may image the cargo grouping on the pallet with a camera positioned above the cargo group, measure the position of each item of cargo based on information acquired from the imaging of the cargo grouping, and then pick the items of cargo one by one from the grouping, and then place the items of cargo individual onto the cargo conveyer or a storage shelf for later distribution.

DETAILED DESCRIPTION

Embodiments provide an unloading apparatus and an unloading method that can efficiently unload cargo in a short time.

In general, according to an embodiment, an unloading apparatus that unloads cargo items from a cargo group on a cargo bed comprises: a cargo bed lifting and lowering mechanism that lifts and lowers a cargo bed; a first detection unit that measures heights of cargos items forming an upper surface of a cargo group and positions, in plan view, of the cargo items forming the upper surface of the cargo group; a moving device that moves the cargo items to an unloading position by individually holding and lifting a cargo item based on a measurement by the first detection unit; a second detection unit that detects whether a lower end of a cargo item being held by the moving device is above a position that is higher than the highest position of the cargo items at the upper surface of the cargo group; and a controller. The controller is configured to control the cargo bed lifting and lowering mechanism to lower the cargo bed in conjunction with the lifting of cargo items by the moving device, and stop the lowering of the cargo bed based on a detection result of the second detection unit. The controller is also configured to control the moving device to move the cargo items to the unloading position.

Figure 1:
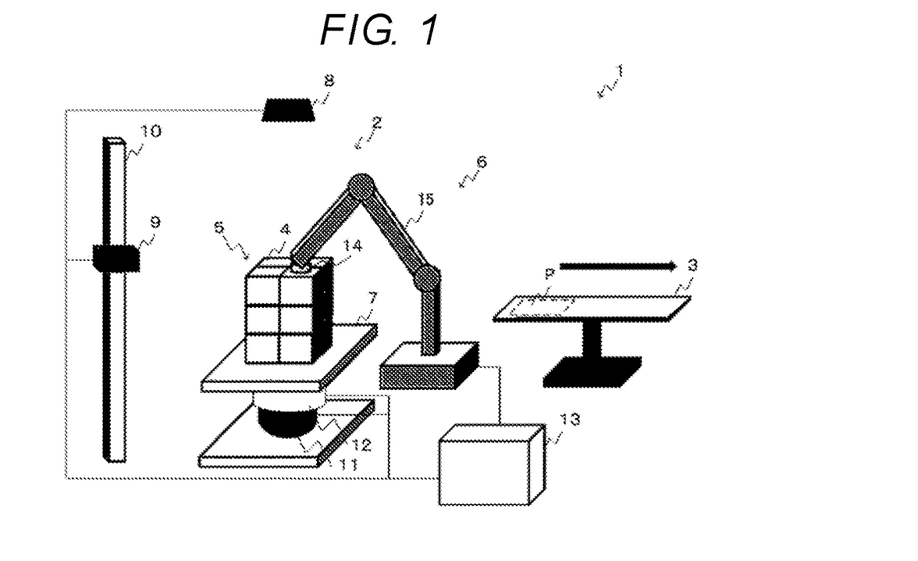
FIG. 1 is a perspective view illustrating an apparatus configuration of a conveyance system including an unloading apparatus according to an embodiment.

Hereinafter, an example conveyance system including an unloading apparatus according to an embodiment will be described with reference to the drawings. FIG. 1 is a perspective view of an apparatus configuration of the conveyance system 1 according to an embodiment.

The conveyance system 1 includes the unloading apparatus 2 and a conveyance apparatus 3 and is configured to convey a plurality of cargo items 4 to another place from an unloading point. The conveyance system 1 is installed in, for example, a physical distribution center from which the cargo items 4, which may be such things as individual packages, are conveyed.

The unloading apparatus 2 is provided with a moving device 6, a cargo bed 7, a first detection unit 8, a second detection unit 9, a guide rail 10, a cargo bed lifting and lowering mechanism 11, a cargo bed rotating mechanism 12, and a controller 13. The unloading apparatus 2 unloads the cargo 4 onto an unloading position P on the conveyance apparatus 3 from a cargo group 5 that includes a plurality of cargo items 4 loaded on the cargo bed 7.

The conveyance apparatus 3 is, for example, a conveyer belt. The conveyance apparatus 3 is used to convey the unloaded cargo items 4 to a desired conveyance destination. In addition, a region surrounded by a broken line in FIG. 1 is the unloading position P, which is a region to which the unloading apparatus 2 moves the cargo 4.

As illustrated in FIG. 1, the moving device 6 is installed at a position such that the moving device 6 can pick up the cargo items 4 from the cargo group 5 loaded on the cargo bed 7 and the moving device 6 can move the picked cargo items 4 to the conveyance apparatus 3. The moving device 6 may be fixed at an installation position and may be configured to be movable within a predetermined area.

The moving device 6 can grab or otherwise hold each of the cargo items 4, then move the cargo items 4 up and down in a vertical direction corresponding to the direction of gravity, and also move the cargo items 4 in a horizontal direction correspond to a direction orthogonal to the vertical direction. In other words, the moving device 6 can grab and lift the cargo items 4 and then move the cargo items 4 to the unloading position P.

The moving device 6 is provided with a holding unit 14 and an arm 15 for moving the held cargo 4.

The holding unit 14 can pick and hold the cargo 4 by means of suction provided by a negative pressure generated with a negative pressure generating device (not shown), for example. The negative pressure generating device is provided with a pump, a pipe that is connected between the pump and the holding unit 14, and a valve for the pipe. The controller 13 can control the pump and the valve. In addition, it is possible to control whether the cargo item 4 is held or released by controlling the pressure in the holding unit 14. The pipe is connected to the holding unit 14 such that a negative pressure generated by the pump acts on the holding unit 14.

The cargo item 4 need not be held by suction provided by the holding unit 14 and the negative pressure generating device in all examples. For example, the holding unit 14 may hold the cargo item 4 by using a clamping unit that can hold the cargo item 4 by physical clamping the cargo item 4 in a transverse direction or the vertical direction.

The cargo item 4 has, for example, a rectangular parallelepiped-like shape or a cubic shape. However, the shape of the cargo items 4 is not necessarily limited to those described above. In FIG. 1, the cargo items 4 loaded on the cargo bed 7, each have the same size and have a rectangular parallelepiped-like shape or a cubic shape, constitute the cargo group 5. However, the sizes of the cargo items 4 may be different from each other. Although FIG. 1 illustrates a configuration in which the cargo items 4 are directly loaded on the cargo bed 7, a configuration, in which a cage cart or the like on which the cargo items 4 are loaded is installed on the cargo bed 7, may also be adopted.

The first detection unit 8 is installed above the cargo bed 7. The first detection unit 8 is installed such that the first detection unit 8 can image at least the entire region on an upper surface of the cargo bed 7, that is, the entire region on an upper surface of the cargo group 5. The first detection unit 8 may be installed such that the first detection unit 8 can move in at least one of the vertical direction and a horizontal direction.

The first detection unit 8 images the upper surface of the cargo group 5 to measure the heights of the cargo items 4 constituting the upper surface of the cargo group 5 and the positions of the cargo items 4 in a plane. The first detection unit 8 is, for example, a 3D camera. That is, the first detection unit 8 obtains information (cargo position information) such as the positions of the cargo items 4 constituting the upper surface of the cargo group 5 in a plane, the sizes of the cargo items 4, or a distance from the first detection unit 8 to the cargo items 4 in the vertical direction (the heights of the cargo items 4).

The second detection unit 9 detects whether a cargo item 4 has been lifted from the cargo group 5 to a position above the cargo group 5. The detection of whether a presently held cargo item 4 has been lifted to a position above the cargo group 5 or not is a detection of whether the height of the held cargo item 4 exceeds a particular determination height or not. That is, the second detection unit 9 detects whether a lower end of the cargo item 4 currently being held by the moving device 6 has been lifted to a position that is higher than the position of an upper end of the next cargo item 4 in the cargo group by a predetermined distance.

Figure 2A:
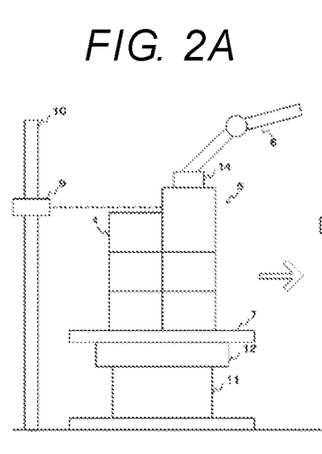
FIGS. 2A to 2C are side views illustrating how the unloading apparatus lifts a cargo according to an embodiment.
Figure 2B:
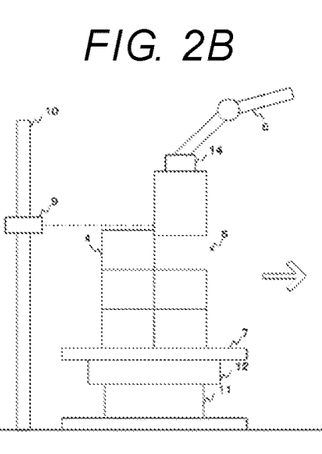
Figure 2C:
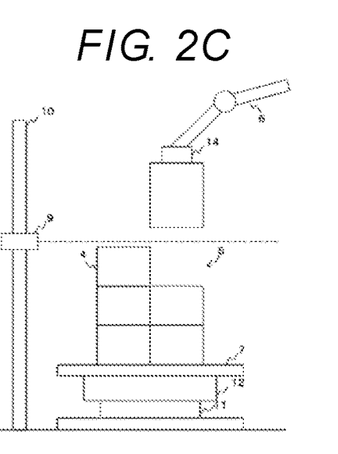

Here, the second detection unit 9 will be described with reference to FIGS. 2A to 2C in addition to FIG. 1. FIGS. 2A to 2C are side views illustrating how the unloading apparatus 2 according to the embodiment lifts a cargo item 4. FIGS. 2A to 2C respectively illustrate a state where the moving device 6 is about to lift the cargo item 4, a state where the moving device 6 is lifting the cargo item 4, and a state after the moving device 6 lifts the cargo item 4 to a position above the remaining cargo group 5.

The second detection unit 9 is, for example, a sensor that can measure a distance to a target object such as the cargo item 4. The second detection unit 9 is, for example, a laser range finder (LRF) which measures a distance to a cargo item 4 or other object in the horizontal direction by emitting a laser beam in the horizontal direction, performing horizontal scanning with the laser beam, and receiving reflected light using a light receiving unit. When the cargo item 4 is present at the same height as the second detection unit 9 (the height of a broken line in FIGS. 2A to 2C) as illustrated in FIGS. 2A and 2B, the laser beam is reflected by the cargo item 4 and is received and thus it is determined that the lower end of the held cargo item 4 is not yet above the upper end of the remaining cargo items 4 of the cargo group 5.

In addition, as illustrated in FIG. 2C, when the lower end of the held cargo item 4 is lifted to a position that is higher than at the highest position of the next cargo item 4, by a predetermined distance, the laser beam is not reflected, and thus it is determined that the lower end of the held cargo item 4 has been lifted to a position that is higher than the position of the upper end of the next highest cargo 4 by a predetermined distance.

For example, as illustrated in FIGS. 2A to 2C, the second detection unit 9 can move along the guide rail 10 that guides the second detection unit 9 to move in the vertical direction. At a position (a determination height position) that is higher than the position of the next highest still loaded cargo item 4 by a predetermined distance, the second detection unit 9 can be lifted and lowered in conjunction with the lifting and lowering of the cargo bed 7. The second detection unit 9 measures a distance to the cargo item 4, which is present at the same vertical position as the second detection unit 9, in the horizontal direction. That is, while the second detection unit 9 is measuring a distance to the cargo item 4 while it is held by the moving device 6, the second detection unit 9 can detect that the lower end of the cargo item 4 held by the moving device 6 has been lifted to a position that is higher than the vertical position of the second detection unit 9 by a predetermined distance. In a case when the cargo bed 7 is lowered by the cargo bed lifting and lowering mechanism 11 in conjunction with the lifting of the cargo 4 held by the moving device 6 as described above, a time taken to lift the cargo item 4 is shortened, and thus it is possible to effectively unload the cargo items 4 in a shorter time.

The second detection unit 9 is lifted and lowered in conjunction with the lifting and lowering of the cargo bed 7 such that the vertical position of the second detection unit 9 relative to the cargo bed 7 is fixed to the determination height position. The determination height is the height at which it is determined that the cargo item 4 held by the moving device 6 is lifted to a position that is higher than the upper surface of the cargo group 5 by a predetermined distance. The determination height is set to a position that is higher than the position of the upper end of the cargo item 4 from among the cargo items 4 constituting the upper surface of the cargo group 5, which is present at the highest position next to the held cargo item 4, by a predetermined distance.

The cargo bed lifting and lowering mechanism 11 is provided with a driving unit (not shown) and lifts and lowers the cargo bed 7 on which the cargo group 5 is loaded. The cargo bed lifting and lowering mechanism 11 can move the cargo item 4 in the vertical direction such that the cargo item 4 is moved to a position at which the moving device 6 can easily grab the cargo 4 by lifting and lowering the cargo bed 7. In addition, the cargo bed lifting and lowering mechanism 11 may be configured such that the cargo bed 7 is lifted with the cargo bed lifting and lowering mechanism 11 driven in a case where the cargo bed 7 is lowered in conjunction with the lifting of the cargo item 4 held by the moving device 6 and thus the position of the holding unit 14 of the moving device 6 in the vertical direction becomes higher than the vertical position of the cargo item 4 to be picked next by at least the predetermined distance. In this case, a track in the vertical direction, which the arm 15 follows in a period of time between when the moving device 6 grabs the cargo item 4 and when the cargo item 4 is unloaded, can be shortened and thus it is possible to shorten an unloading time.

The cargo bed rotating mechanism 12 is provided with a driving unit (not shown) and rotates the cargo bed 7 on which the cargo group 5 is loaded. The cargo bed rotating mechanism 12 can move the cargo item 4 to be selected next by rotating the cargo bed 7 such that the cargo item 4 to be selected next is moved to a position at which the moving device 6 can easily grab the cargo item 4. For example, the cargo bed rotating mechanism 12 may be driven such that the cargo bed 7 is rotated in a direction in which the position of the next cargo item 4 to be picked by the moving device 6 next in a particular plane becomes close to the unloading position P. In this case, a track in the horizontal direction, which the arm 15 follows in a period of time between when the moving device 6 holds the next cargo item 4 and when the next cargo item 4 is unloaded, can be shortened and thus it is possible to shorten an unloading time.

Figure 3:
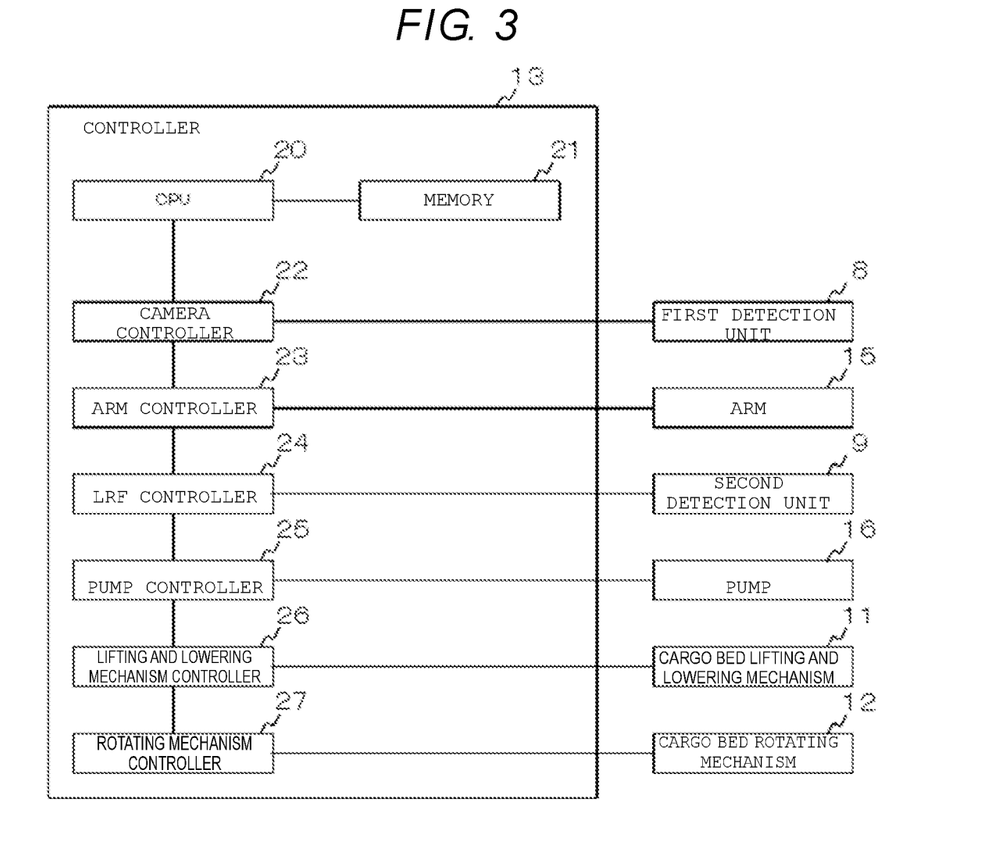
FIG. 3 is a block diagram illustrating an example of a functional configuration of a controller of a conveyance system according to an embodiment.

The controller 13 controls the entire conveyance system 1. A functional configuration of the controller 13 will be described with reference to FIG. 3. FIG. 3 is a block diagram illustrating an example of a functional configuration of the controller 13 of the conveyance system 1 according to an embodiment.

The controller 13 is provided with a CPU 20, a memory 21, a camera controller 22, an arm controller 23, an LRF controller 24, a pump controller 25, a lifting and lowering mechanism controller 26, and a rotating mechanism controller 27.

The CPU 20 executes various programs stored in the memory 21. Examples of the memory 21 include a RAM, a ROM, a rewritable non-volatile memory (for example, an EEPROM or the like), and the like. The memory 21 stores the various programs executed by the CPU 20.

The camera controller 22 controls the first detection unit 8 (a camera). The camera controller 22 acquires the cargo position information from an image captured by the first detection unit 8 and selects the cargo item 4 to be held next by the moving device 6 as a target. In addition, the camera controller 22 sets the determination height with respect to the target cargo 4.

The arm controller 23 controls the arm 15 of the moving device 6. The arm controller 23 calculates a track, which the arm 15 follows in a period of time between when the target cargo item 4 is held and when the target cargo item 4 is unloaded, from the cargo position information acquired by the camera controller 22. In addition, the arm controller 23 drives the arm 15 along the calculated track. The arm 15 may be controlled such that the holding unit 14 moves from a position at which unloading is finished, that is, the vicinity of the unloading position P, to a position at which the next target is held and the arm 15 may be controlled such that the holding unit 14 returns to an initial position for each time unloading is finished.

The LRF controller 24 controls the second detection unit 9. The LRF controller 24 controls the second detection unit 9 such that the second detection unit 9 is fixed at the determination height position set by the camera controller 22. In addition, the LRF controller 24 causes the second detection unit 9 to be lifted and lowered in conjunction with the lifting and lowering of the cargo bed 7 performed by the cargo bed lifting and lowering mechanism 11. Control that is performed in conjunction with the lifting and lowering of the cargo bed 7 will be described later in detail. In addition, the LRF controller 24 acquires information related to the distance measured by the second detection unit 9 and a height at which the second detection unit 9 is fixed and stores the information in a memory unit (not shown).

The pump controller 25 controls the valve of the pipe provided between a pump 16 and the holding unit 14. The pump controller 25 controls whether the cargo item 4 is held or released by controlling the valve such that the pressure in the holding unit 14 becomes a negative pressure and the cargo item is sucked and held at a time of holding the cargo 4 and controlling the valve such that the pressure in the holding unit 14 returns to the atmospheric pressure at a time of loading (releasing) the held cargo item 4 onto the unloading position P.

The lifting and lowering mechanism controller 26 controls the cargo bed lifting and lowering mechanism 11. The lifting and lowering mechanism controller 26 controls the driving unit of the cargo bed lifting and lowering mechanism 11 such that the cargo bed lifting and lowering mechanism 11 is driven.

The rotating mechanism controller 27 controls the cargo bed rotating mechanism 12. The rotating mechanism controller 27 controls the driving unit of the cargo bed rotating mechanism 12 such that the cargo bed rotating mechanism 12 is driven and the cargo bed is rotated.

Figure 4:
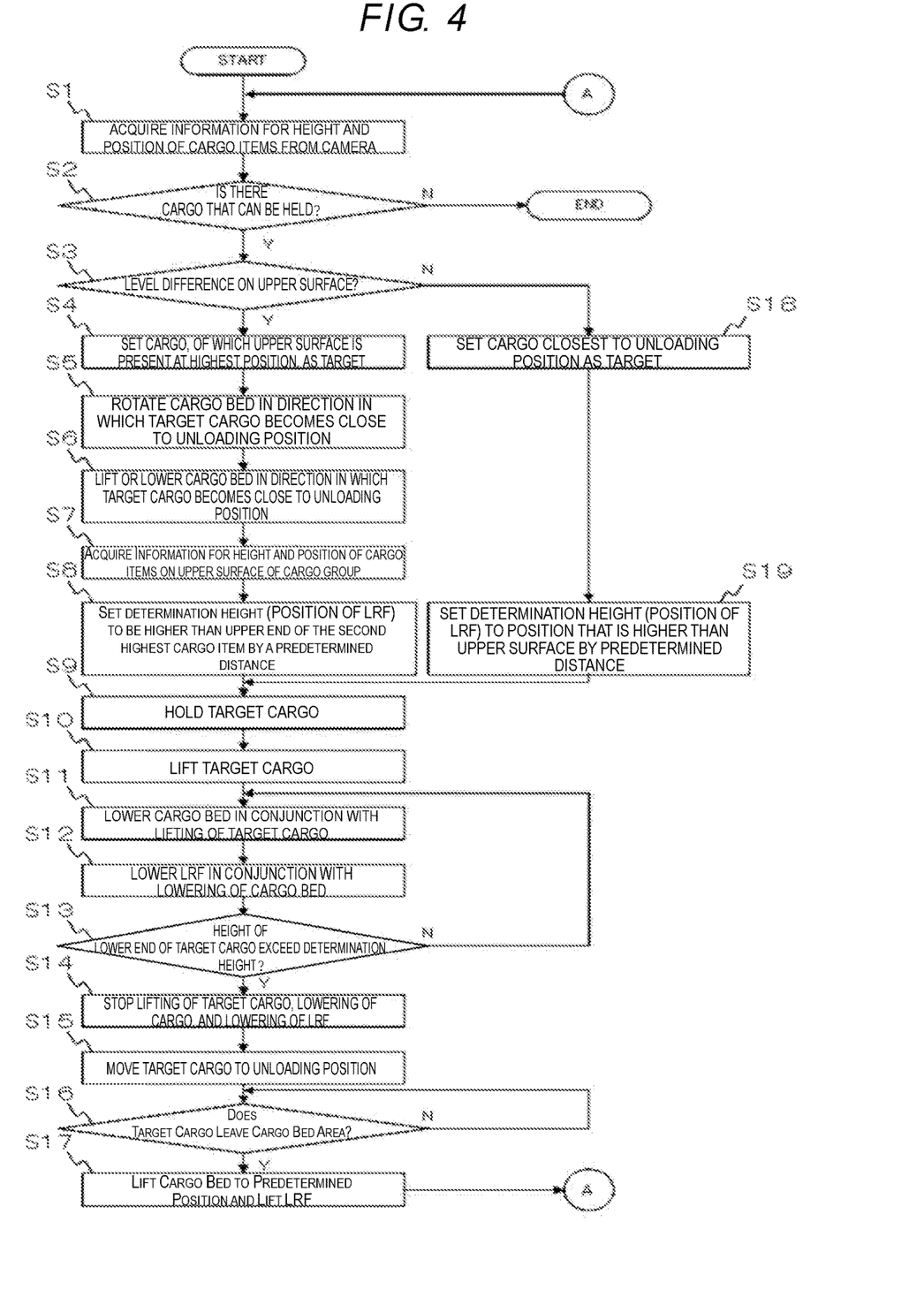
FIG. 4 is a flowchart of an operation of the conveyance system according to an embodiment.

Next, the operation of the conveyance system 1 will be described with reference to FIG. 4. FIG. 4 is a flowchart illustrating an example of the operation of the conveyance system 1 according to an embodiment.

First, the controller 13 controls the first detection unit 8 such that the first detection unit 8 images the upper surface of the cargo group 5 and acquires information (the cargo position information) about the heights of the cargo items 4 constituting the upper surface of the cargo group 5 and the positions of the cargo items 4 in a plane from a captured image (Step S1).

Next, the controller 13 determines whether there is a cargo item 4 that can be held (Step S2). In a case where there is a cargo item 4 that can be held (Step S2, Yes), it is determined whether there is a level difference on the upper surface of the cargo group 5 (Step S3). That is, the controller 13 determines whether there is a difference between the heights of upper ends of the cargo items 4 constituting the upper surface of the cargo group 5.

In a case where there is a level difference on the upper surface of the cargo group 5 (Step S3, Yes), the controller 13 sets the cargo item 4, of which an upper surface is present at the highest position, as the target cargo item 4 to be held (Step S4). Next, the controller 13 drives the cargo bed rotating mechanism 12 such that the cargo bed 7 is rotated in a direction in which the target, which is the cargo item 4 to be held by the moving device 6 next, becomes close to the unloading position P (Step S5). In addition, the controller 13 drives the cargo bed lifting and lowering mechanism 11 to lift and lower the cargo bed 7 in a direction in which the target cargo item 4 becomes close to the unloading position, that is, until the cargo bed 7 reaches a position (a target cargo bed vertical position) at the same height as the unloading position (Step S6). The target cargo bed vertical position is not limited to the position at the same height as the unloading position and may be, for example, a position at the same height as the holding unit 14 of the arm 15 on an initial position.

Next, the controller 13 controls the first detection unit 8 such that the first detection unit 8 images the upper surface of the cargo group 5 again and acquires information related to the heights of the cargo items 4 constituting the upper surface of the cargo group 5 and the positions of the cargo items 4 in a plan view from a captured image (Step S7). This is because there is a possibility that the state of the cargo group 5 becomes different from that at the time of the imaging operation in Step S1 due to the lifting, lowering, and rotating of the cargo bed 7. The amount of change in height and position of each cargo item 4 which occurs due to the lifting, lowering, and rotating of the cargo bed 7 may be determined from the plan view and calculated to estimate the height of each cargo item 4 and the position of each cargo item 4 in a plane based on the information acquired from the image captured in Step S1. In this case, Step S7 may be omitted.

Next, the controller 13 sets the determination height to a position that is higher than the position of an upper end of the cargo item 4, of which an upper surface is present at the highest position in the cargo group 5 next to the cargo item 4 to be held, by a predetermined distance (Step S8). That is, the controller 13 sets the vertical position of the second detection unit 9 to a position that is higher than the position of an upper end of the cargo item 4, of which an upper surface is present at the highest position in the cargo group 5 next to the cargo item 4 to be held, by a predetermined distance.

Then, the controller 13 controls the moving device 6 such that the moving device 6 holds the target cargo item 4 (Step S9) and the target cargo item 4 starts to be lifted (Step S10). In addition, the controller 13 drives the cargo bed lifting and lowering mechanism 11 such that the cargo bed 7 is lowered in conjunction with the lifting of the target cargo item 4 (Step S11). Furthermore, the controller 13 causes the second detection unit 9 to be lowered at the same speed as the cargo bed 7 in conjunction with the lowering of the cargo bed 7 (Step S12). Since the cargo bed 7 is lowered in conjunction with the lifting of the target cargo item 4, a distance by which the moving device 6 needs to lift the cargo 4 is shortened, and thus it is possible to shorten a time taken to lift the target cargo item 4. In addition, since the determination height position is the height relative to the upper end of the cargo item 4 which is present at the second highest position, the cargo bed 7 (or more particularly the cargo item 4) and the second detection unit 9 need to be lowered at the same time and by the same distance.

Next, the controller 13 determines whether the height of the lower end of the held cargo item 4 exceeds the determination height (Step S13). In a case where the controller 13 determines that the height of the lower end of the held cargo item 4 exceeds the determination height based on the result of detection performed by the second detection unit 9 (Step S13, Yes), the controller 13 performs control such that the moving device 6 stops to lift the held cargo item 4, the cargo bed lifting and lowering mechanism 11 is driven to stop to lower the cargo bed 7, and the second detection unit 9 stops to be lowered (Step S14) since the held cargo item 4 does not collide with other cargo items 4 even when the held cargo item 4 is moved horizontally in this case. Thereafter, the moving device 6 is driven such that the held cargo item 4 is moved to the unloading position (Step S15).

Next, the controller 13 determines whether the held cargo 4 leaves a position above the cargo bed 7 in order to prevent the held cargo item 4 from colliding with the cargo group 5 (Step S16). The determination process in Step S16 is repeated until the first detection unit detects that the held cargo item 4 leaves the position above the cargo bed 7.

Finally, after the held cargo item 4 leaves the position above the cargo bed 7, the controller 13 drives the cargo bed lifting and lowering mechanism 11 such that the cargo bed 7 is lifted to a predetermined position and causes the second detection unit 9 to be lifted (Step S17). After the process in Step S17 is finished, the process returns to Step 1. The process is repeated until the cargo item 4 that can be held is not detected in Step S2 (Step S2, No).

In addition, in a case where there is no level difference on the upper surface of the cargo group 5 in Step S3 (Step S3, No), the cargo item 4, which is closest to the unloading position P, is set as a holding target since the vertical positions of upper ends of all of the cargo items 4 constituting the cargo group 5 are the same (Step S18). Regarding the determination height, since the vertical positions of the upper ends of all of the cargo items 4 constituting the cargo group 5 are the same, the determination height is set to a position that is higher than the upper surface of the cargo group 5 by a predetermined distance (Step S19).

By performing operations in the order as described above, it is possible to shorten a track which the arm 15, which is the movable unit of the moving device 6, follows when the cargo item 4 loaded on the cargo bed 7 is unloaded and to reduce the time taken to unloading the cargo item 4. That is, according to the unloading apparatus 2 in the embodiment, it is possible to efficiently unload the cargo item 4 in a short time.

The processes in the unloading apparatus 2 according to the above-described embodiment can be implemented by a number of software programs. Therefore, it is possible to easily realize the processes only by installing a number of programs for implementing a sequence of the processes into the unloading apparatus 2 through a computer-readable recording medium in which the programs are stored. For example, the unloading apparatus 2 can download the programs over a network, store the downloaded programs, and finish installation of the programs. Alternatively, the unloading apparatus 2 can read the programs from an information recording medium, store the read programs, and finish installation of the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An unloading apparatus that unloads cargo items from a cargo group on a cargo bed, the unloading apparatus comprising:
   a cargo bed lifting and lowering mechanism that lifts and lowers a cargo bed;
   a first detection unit that measures heights of cargo items forming an upper surface of a cargo group and positions, in plan view, of the cargo items forming the upper surface of the cargo group;
   a moving device that moves the cargo items to an unloading position by individually holding and lifting a cargo item based on a measurement by the first detection unit;
   a second detection unit that detects whether a lower end of a cargo item being held by the moving device is above a position that is higher than the highest position of the cargo items at the upper surface of the cargo group; and
   a controller configured to:
      control the cargo bed lifting and lowering mechanism to lower the cargo bed in conjunction with the lifting of cargo items by the moving device, and stop the lowering of the cargo bed based on a detection result of the second detection unit, and control the moving device to move the cargo items to the unloading position.

2. The unloading apparatus according to claim 1, wherein the controller controls the cargo bed lifting and lowering mechanism to lift the cargo bed to keep the upper surface of the cargo group at a set position as cargo items are removed from the cargo group.

3. The unloading apparatus according to claim 2, wherein the second detection unit measures a distance to the cargo items in a horizontal direction and detects whether the lower end of a cargo item being held by the moving device is above the highest position of any remaining cargo item in the cargo group next by a predetermined distance.

4. The unloading apparatus according to claim 2, wherein the controller is configured to control the second detection unit to lift and lower in conjunction with the lifting and lowering of the cargo bed.

5. The unloading apparatus according to claim 1, wherein the second detection unit measures a distance to the cargo items in a horizontal direction and detects whether the lower end of a cargo item being held by the moving device is above the highest position of any remaining cargo item in the cargo group next by a predetermined distance.

6. The unloading apparatus according to claim 1, wherein the second detection unit is a laser range finder.

7. The unloading apparatus according to claim 1, wherein the second detection unit is configured to lift and lower in conjunction with the lifting and lowering of the cargo bed.

8. The unloading apparatus according to claim 1, further comprising:

a cargo bed rotating mechanism that rotates the cargo bed, wherein the controller controls rotation of the cargo bed in a direction in which the next cargo to be held by the moving device becomes close to the unloading position.

9. The unloading apparatus according to claim 8, wherein the controller is configured to control the second detection unit to lift and lower in conjunction with the lifting and lowering of the cargo bed.

10. The unloading apparatus according to claim 8, wherein the controller controls the cargo bed lifting and lowering mechanism to lift the cargo bed after cargo items have been removed for the cargo group to keep the upper surface of the cargo group at a set position.

11. A method of unloading cargo items from a cargo group on a cargo bed to an unloading position, the method comprising:

measuring heights of the cargo items at an upper surface of the cargo group;

detecting positions of the cargo items in the cargo group in a plan view;

holding and then lifting an individual cargo item with a moving device using detected positions and measured heights of the cargo items;

lowering the cargo bed during the lifting of the individual cargo item;

stopping the lowering of the cargo bed once a detected height of a lower end of the individual cargo item being lifted by the moving device is above a measured height of an adjacent cargo item which was adjacent to the individual cargo item within the cargo group, the position being above the measured height of the adjacent cargo item by a predetermined distance; and moving the individual cargo item to the unloading position using the moving device.

12. The method according to claim 11, wherein the cargo bed is raised after the individual cargo item is moved to a position that is beyond the outer perimeter of the cargo bed in plan view.

13. The method according to claim 11, wherein the heights of the cargo items are measured using an image captured by a first detection unit positioned above the cargo bed, and the positions of the cargo items in plan view are detected in an image captured by a camera.

14. The method according to claim 11, wherein moving unit comprises a robot arm and a holding unit to hold the cargo items.

15. The method according to claim 11, wherein the cargo group comprises cargo items having different sizes.

16. The method according to claim 11, further comprising:

after moving the individual cargo item to the unloading position using the moving device, rotating the cargo bed in a direction such that a next cargo item to be unloaded becomes closer to the unloading position.

17. The method according to claim 11, wherein the heights of the cargo items are measured using a laser range finder on a guide rail adjacent to the cargo bed.

18. An unloading system that unloads cargo items from a cargo group on a cargo bed, the unloading system comprising:

a cargo bed on which a cargo group can be disposed, the cargo group comprising a plurality of cargo items;

a cargo bed lifting and lowering mechanism configured to raise and lower the cargo bed relative to an unloading position for the plurality of cargo items;

a camera disposed above the cargo bed in a vertical direction and configured to acquire images of the cargo group on the cargo bed;

a robot arm configured to grasp an individual cargo item in the plurality of cargo items, lift the individual cargo item in the vertical direction, and move the individual cargo item in a horizontal direction to an unloading position;

a laser range finder on a guide rail adjacent to the cargo bed, the laser range finder being configured to translate along the guide rail in a vertical direction; and a controller configured to:

determine heights of cargo items at an upper surface of the cargo group;

detecting positions of the cargo items in the cargo group in a plan view;

control the robot arm to grasp, lift, and move the individual cargo item according the detected positions and determined heights of the cargo items;

lower the cargo bed during the lifting of the individual cargo item; and stop the lowering of the cargo bed once a detected height of a lower end of the individual cargo item being lifted is above a measured height of an adjacent cargo item which was adjacent to the individual cargo item within the cargo group by a predetermined distance.

19. The unloading system according to claim 18, wherein the robot arm grasps the individual cargo item using vacuum.

20. The unloading system according to claim 18, further comprising:
a rotation mechanism configured to rotate the cargo bed.

* * * * *